Jan. 19, 1960 L. L. BLUM 2,921,382
SHRIMP PREPARING MACHINE
Filed Oct. 23, 1957 4 Sheets-Sheet 1

Louis L. Blum
INVENTOR.

Jan. 19, 1960 L. L. BLUM 2,921,382
SHRIMP PREPARING MACHINE
Filed Oct. 23, 1957 4 Sheets-Sheet 2

Louis L. Blum
INVENTOR.

BY *Clarence A. O'Brien*
*and Harvey B. Jacobson*
Attorneys

Jan. 19, 1960   L. L. BLUM   2,921,382
SHRIMP PREPARING MACHINE
Filed Oct. 23, 1957   4 Sheets-Sheet 3
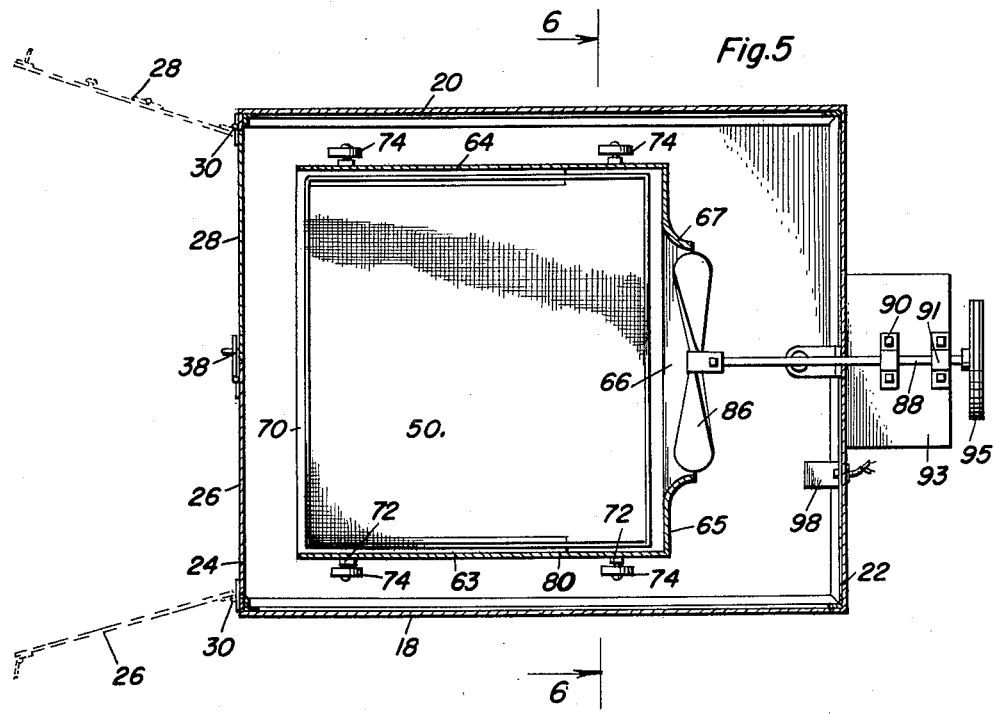
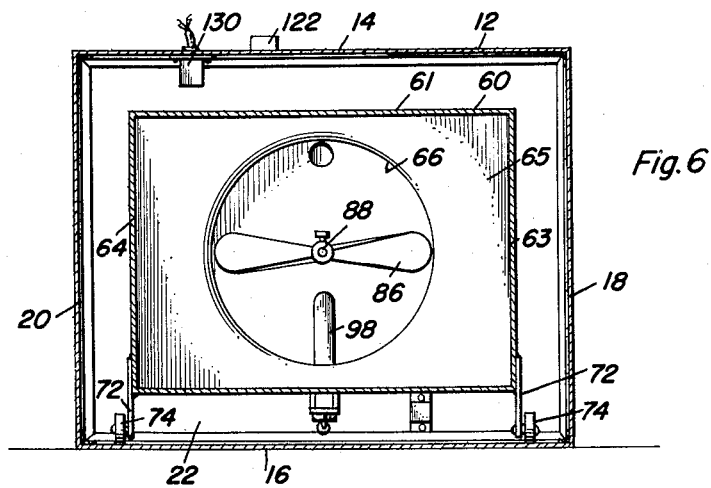
Louis L. Blum
INVENTOR.
BY Clarence A. O'Brien
and Harvey B. Jacobson
Attorneys Jan. 19, 1960 — L. L. BLUM — 2,921,382
SHRIMP PREPARING MACHINE
Filed Oct. 23, 1957 — 4 Sheets-Sheet 4

Louis L. Blum
INVENTOR.

BY Clarence A. O'Brien
and Harvey B. Jacobson
Attorneys

United States Patent Office 2,921,382
Patented Jan. 19, 1960

2,921,382

SHRIMP PREPARING MACHINE

Louis L. Blum, Houma, La.

Application October 23, 1957, Serial No. 691,835

3 Claims. (Cl. 34—48)

This invention relates to food preparation equipment and more particularly to drying machines for processing shrimp, although the principles of the invention may be practiced in connection with the drying of other foods or inedible items.

The principal object of the invention is to provide a machine which will have an efficient evaporating characteristic and at the same time will protect the article being dried from oil fumes, contamination and unevenness in the dried products.

Machines for drying shrimp are commercially available. I have experienced considerable difficulties from oil fumes and contamination in using integral driving equipment in the presently available machines. My colleagues have experienced like difficulties. The present invention, by the structural organization of parts and the air circuits, make it virtually impossible to contaminate the products.

A further object of the invention is to provide a food drier having easily accessible internal parts. These, then, can be easily cleaned. Here again, prior machines have had racks and shelves which were difficult to clean, thereby necessitating a larger shut-down time of the machine and considerable effort for keeping the machine in a cleanly condition. As we know from the prior art, shrimp, or for that matter practically all kinds of water habitating food, have a very short period within which they remain sweet and generally odor-free. It is, therefore, essential that the equipment be very clean and that the shrimp be handled reasonably promptly without long periods of equipment shut-down or difficulties involved from fumes and odors arising from the machine.

In accordance with the above discussion, the importance of minimum interruption during drying is understandable. A further object of this invention is to provide means of obtaining the weight of the article being dried during the entire drying process without interrupting the drying process. By inspection from the exterior of the machine, the machine operator is able to see the weight of a sample and observe the continual decrease during the drying operation.

A further object of the invention is to provide a compactly constructed machine that has no external air circulating ducts. Therefore, the entire configuration requires a reduced distance of air recirculation and this leads to greater efficiency and drying uniformity.

A more particular object of the invention is to provide a drying machine which, by virtue of the construction, is capable of a much more uniform drying. This is at least in part achieved by having a housing within which there is a concentrically disposed chamber. This chamber has the shrimp in it with the space between the walls of the chamber and the walls of the housing being just about uniform completely around the chamber. One end of the chamber is open and functions as a drying air inlet, while the other end has an air impeller in it to draw the air through the air entrance and over and around the shrimp within the drying chamber. The physical arrangement of the chamber with respect to the housing is important because it leads to a better uniformity of drying. The flow is in one direction through the chamber and around the products that are to be dried, while the flow between the chamber walls and the housing walls is in the opposite direction. There is a reversal of flow at the open, entrance end of the chamber and this together with the propeller blast against a wall of the housing and turbulence formed by the propeller is responsible for uniform mixing of the air throughout a cycle of operation.

The propeller is located within the housing and is mounted on a shaft. This shaft passes through an opening in the housing and may be provided with a seal, packing, etc. The motor and bearings for the propeller shaft and motor are all located on the exterior of the housing. Any evaporation, oil or other fumes are on the outside of the housing and cannot contaminate the shrimp.

Other objects and features of importance will become apparent in following the description of the illustrated form of the invention.

Figure 5 is a horizontal sectional view taken on the line 5—5 of Figure 3.

Figure 6 is a transverse sectional view taken on the line 6—6 of Figure 5.

Figure 1:
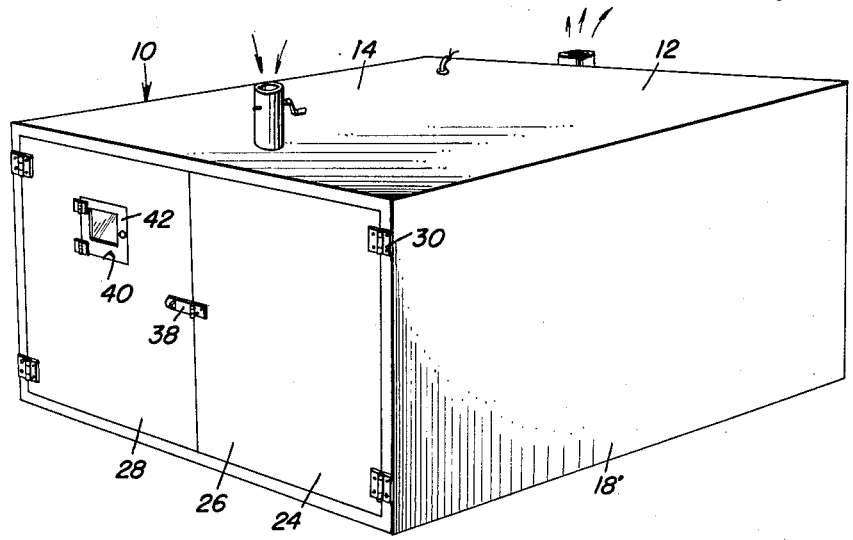
Figure 1 is a perspective view of a shrimp drying machine which exemplifies the principles of the invention.

In the accompanying drawings there is a machine 10 that is constructed to effectively and uniformly, as well as efficiently, process foods and particularly shrimp. Although the description that ensues is in connection with shrimp, it is to be understood that the principles of the invention are applicable with other food products. Machine 10 is constructed of a housing 12 which has a top wall 14, a bottom wall 16, two side walls 18 and 20, a back wall 22 and a front wall 24. The front wall is made largely of a pair of doors 26 and 28 connected by hinges 30 at their edges to the housing in the region of the side walls 18 and 20. The doors 26 and 28 are capable of swinging fully open to expose a large entrance to the housing. Any kind of suitable latch 38 can be used for holding the doors in the closed position. An inspection opening 40 is in door 28 and has an inspection door 42 mounted hingedly thereover. The inspection door is preferably provided with a window for inspection of the scales 44 hanging from hook 46 that is connected with the top wall 14 of the housing. A pan 48 is attached to the scales 44 and is used for a sample of shrimp. The operator of the machine may inspect the scales 44 during the drying process in order to determine the condition of the sample in pan 48 and thereby extrapolate as to the condition of the shrimp on baskets 50.

Figure 2:
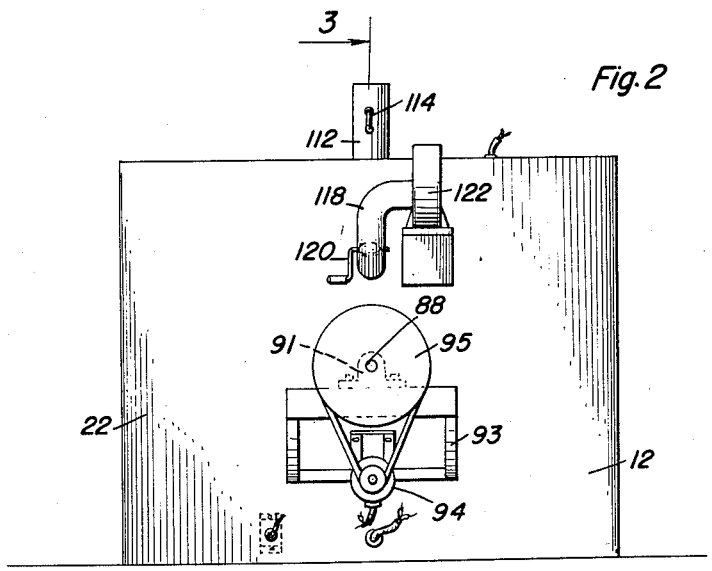
Figure 2 is a rear view of the machine in Figure 1.
Figure 3:
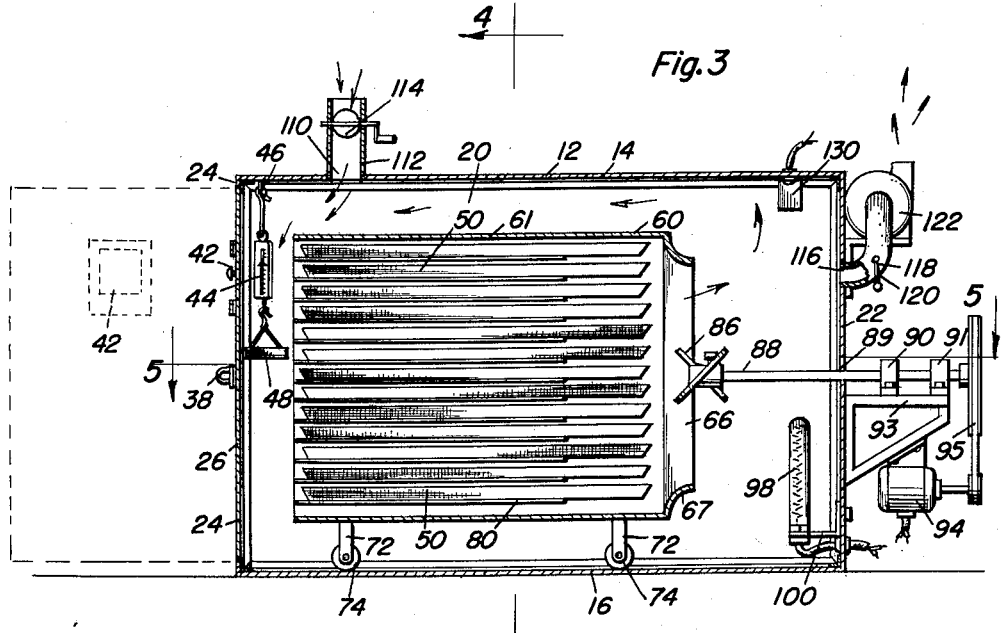
Figure 3 is a longitudinal sectional view taken on the line 3—3 of Figure 2.
Figure 4:
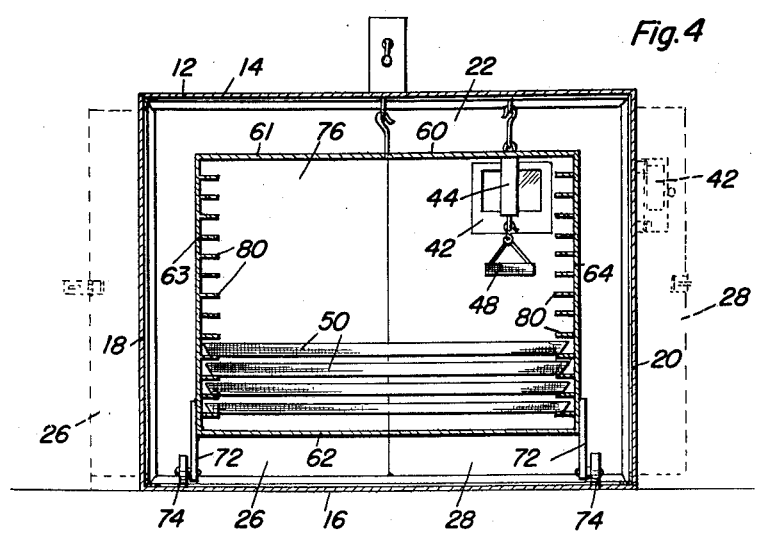
Figure 4 is a transverse sectional view taken on the line 4—4 of Figure 3.
Figure 7:
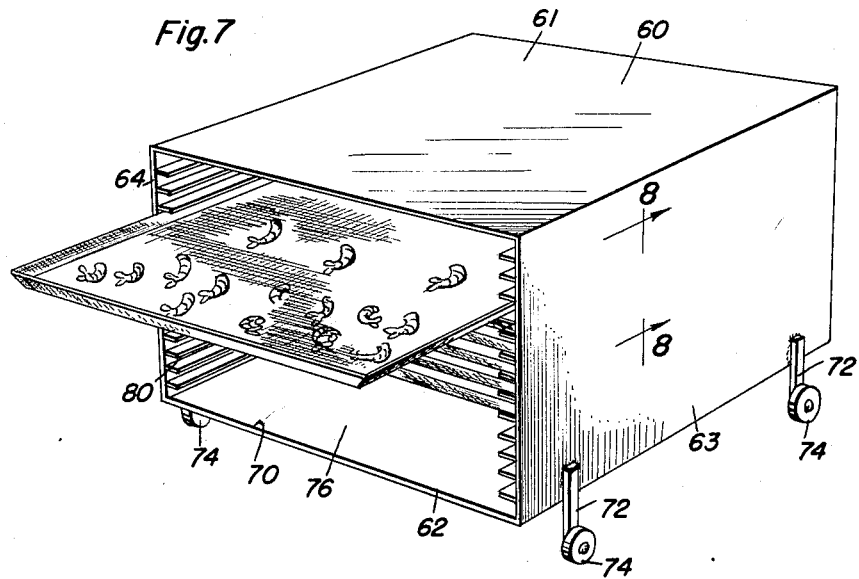
Figure 7 is a perspective view of the inner casing which encloses the chamber on which the shrimp or other product is placed for drying.

An inner casing 60 is removably mounted within the housing 12. The inner casing is constructed of a top wall 61, a bottom wall 62, a pair of side walls 63 and 64, together with an end wall 65. This end wall has an opening 66 in it, around the edge of which annular fairing 67 is located. The end of casing 60 opposite to wall 65 is open to form an air entrance 70, with opening 66 functioning as an air discharge. A plurality of legs 72 depend from the bottom part of casing 60, and wheels 74 are mounted for rotation thereon. The casing can be moved into and separated from the opening at the end of housing 12 by using the wheels 74. Moreover, the legs 72 are of a proper length so that the casing 60 is spaced from the bottom wall 16 of the housing a distance which is the same as the space between the top wall of the casing and the top wall of the housing. It is one of the features of the invention to have the casing 60 which encloses drying chamber 76 to be concentrically mounted or very nearly so within the housing 12. The reason is that a preferred circulatory system is established in this way (Figure 2).

Baskets 50 are in the form of screen trays that rest on a plurality of ledges 80 that protrude inwardly of chamber 76 from the two side walls 63 and 64 of casing 60. The baskets are easily separated from the casing by pulling them through the open end of the casing. There are no locks, clamps or other fasteners necessary in my chamber 76.

It is another important feature of the invention to have the entire interior of the housing 12 free from fumes, gases or other sources of contamination. Therefore, I have mounted the air impeller 86 on a shaft 88. The impeller is in the form of a propeller located within the fairing 67. Shaft 88 extends through a hole 89 in the back wall 22 of housing 12. If desirable or necessary a packing or seal can be placed around shaft 88. The bearings 90 and 91 for shaft 88 are on the exterior of housing 12 and are supported by a stand 93. Motor 94 is also supported by stand 93 on the exterior of casing 12. The drive connection between the motor and the shaft 88 is established by a belt and pulley transmission 95, although other types of transmissions may be adopted or even a direct drive may be used. Any means of speed selection can be adopted, and this includes either mechanical such as speed changer or electrical, such as rheostat for motor 94. It is an important feature to control the velocity of air circulation for it is found that maximum air velocity decreases drying time. Moreover, different velocities should be employed for materials having different weights and textures. Also, depending on the amount of loading in the chamber and the restriction of the circulating spaces therein, varying speeds on the impeller are required to produce the desired velocity. Hence, the bearings for shaft 88 and the means that propel the shaft are all located on the exterior of the casing where there can be no reasonable expectancy of any contamination of the shrimp from this source.

Figure 9:
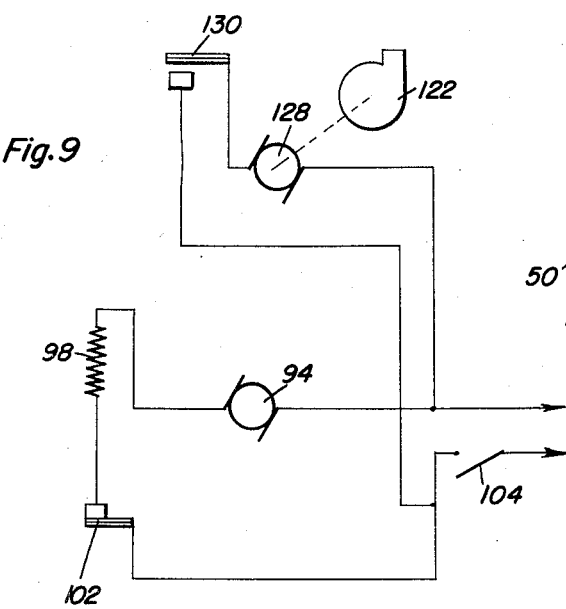
Figure 9 is a schematic view showing a typical circuit for the machine.
Figure 8:
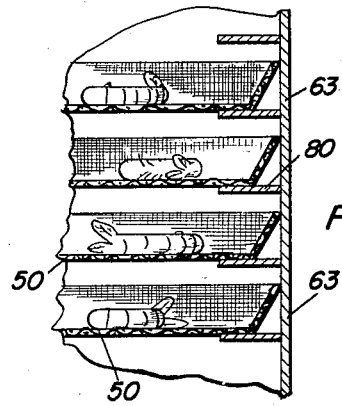
Figure 8 is an enlarged fragmentary sectional view showing the means by which the trays or baskets are separably held in place within the chamber.

Air drier 98 shown as a heater is located within the housing 12 inasmuch as there are no lubricants. The standard air drier 98 is sanitary and can be located within the housing 12 without contaminating the shrimp. Accordingly, the air drying heater is attached to a bracket 100 and the bracket is, in turn, attached to the housing back wall 22. I have shown a thermostat 102 schematically connected with the heater 98, the thermostat located in the housing. In addition (Figure 9), there is switch 104 to control the electric motor 94 and the heater 98. These are shown in series connection with each other, but this is merely a schematic representation and other operative wiring arrangements will be adopted.

A supplemental air inlet opening 110 is formed in the top wall 14 and has a pipe 112 connected with it. Damper 114 is in the pipe 112 to control the amount of supplemental air that is introduced in the machine. An air outlet opening 116 is in the wall 22 of housing 12 and has a duct 118 registered with it. Damper 120 in duct 118 regulates the air that is bled off from the air stream. In some cases where the amount of bled air is to be accelerated, a blower 122 is connected with duct 118. The blower and/or dampers 120 and 114 are regulated by humidistat 130. The humidistat is disposed within the housing 12 and is operatively wired with the blower motor 128 and the humidistat 130. This humidistat may be of standard form, that is combining both temperature and humidity sensors or may be of the type that senses only humidity.

In operation, the shrimp S are placed on the baskets 50 and the chamber enclosing casing 60 pushed into the housing 12. Of course, if the operator desires he can fill the casing 60 while it remains in housing 12. A sample is placed in pan 48 and the main doors 26 and 28 are closed. Due to the dimensioning of the casing and housing, the casing is concentrically located within the housing and any deviation from concentricity is small.

Then the motor for the air impeller and the other functioning parts of the machine are set into operation. The air flow is of importance. It is drawn through the entrance 70 of chamber 76 and in and around the shrimp baskets. The air is discharged through opening 66 and blasts toward the back wall 22 of the housing where it is required to change directions and flow in the concentric passage in between the walls of the casing and the walls of the housing. It reaches the doors 26 and 28 and again changes direction, passing over the sample supporting pan 48 and into the entrance 70.

In the path of travel of the air, it flows over and around the heater 98. Some air is bled off and discharged and supplemental air is automatically added, depending on the settings of the dampers in ducts 118 and 112.

The evaporation of liquid from product S is aided by adding heat to the circulation air which passes around heater 98. The product, usually shrimp but not necessarily so (the product could be another food or something inanimate such as painted products or clothing), is spread over a wide area by using a multiplicity of baskets 50. The moisture laden air surrounding the product is steadily replaced with dry air. This is done by blowing over the product with air recirculated by air impeller 86. This air is warmed by heater 98. The moist air is bled through duct 118 and fresh dry air is introduced through pipe 112. The pressure in the machine is subatmospheric which further aids in rapid evaporation. By choking down the entrance of fresh air by damper 114 in pipe 112 and increasing the quantity of air bled off by blower 122, the pressure within the chamber is lowered.

Various modifications may be made without departing from the invention as claimed. For example, instead of hanging the scales 44 from the top wall 14 of housing 12, the scales may be located on the exterior of the housing and suspended from an overhead beam, ceiling, etc. In that case, a hole is formed in the top wall 14 and the scales 44 placed on the outside of the housing. The scales are hung and a string passed through the hole in the housing top wall 14. Pan 48 is attached to the string so that it can be located in front of the entrance 70 of the chamber 76.

What is claimed as new is as follows:

1. In a shrimp drying machine, a housing having walls, a casing forming a drying chamber, said casing located in said housing and having side walls which are spaced from the side walls of said housing to form an air passage between the walls of said casing and the walls of said housing, an end of said casing being open and constituting an air entrance, means to support the shrimp in the chamber, an air impeller having a shaft and a shaft supporting bearing, said casing having an air discharge opening aligned with the air entrance, said air impeller located in said discharge opening and said shaft supporting bearing located on the exterior of said housing, means on the exterior of said housing for actuating said air impeller shaft and thereby draw air through said entrance, over the shrimp and through the discharge of said chamber for recirculation in the spaces between said walls of said casing and housing, an electric heater disposed in said housing and located in the path of travel of the air, said housing being essentially closed so that the air flowing through said chamber moves in one direction, while the air flowing within said space between the chamber walls and housing walls flows in the opposite direction, said housing having a fresh air inlet provided with a damper to admit a controlled quantity of air into said housing, a moisture laden air outlet duct connected with said housing, and an air blower connected with said outlet duct to withdraw some of the air from said housing and to reduce the pressure in said housing to subatmospheric.

2. In a shrimp drying machine, a housing having walls, a casing forming a drying chamber, said casing located in said housing and having side walls which are spaced from the side walls of said housing to form an air passage between the walls of said casing and the walls of said housing, an end of said casing being open and constituting an air entrance, means to support the shrimp in the chamber, an air impeller, said casing having a discharge opening aligned with the air entrance, said air impeller located in said discharge opening, means on the exterior of said housing for actuating said air impeller and thereby draw air through said extrance, over the shrimp and through the discharge of said chamber for recirculation in the spaces between said walls of said casing and housing, an electric heater disposed in said housing in the path of movement of the air, said housing being essentially closed so that the air flowing through said chamber moves in one direction, while the air flowing within said space between the chamber walls and housing walls flows in the opposite direction, said housing having a fresh air inlet provided with a damper to admit a controlled quantity of air into said housing, a moisture laden air outlet duct connected with said housing, an air blower connected with said outlet duct to withdraw some of the air from said housing and to reduce the pressure in said housing to subatmospheric, means including a door at a part of said housing through which said casing is adapted to move, means including wheels supporting said casing so that it is capable of easily moving, a sample supporting pan in said housing, and an inspection opening in said housing through which the sample supporting pan may be inspected.

3. In a shrimp drying machine which has a housing provided with walls and a casing provided with walls which enclose a drying chamber, said casing having open ends to form an air entrance and an air discharge opening, means for supporting shrimp in the chamber, an air impeller blade disposed in said housing, a shaft to which said blade is secured, a wall of said housing having an aperture through which said shaft extends, a motor support on the exterior of said housing, at least one bearing on the exterior of said housing and within which the part of said shaft on the exterior of said housing is mounted for rotation, means drivingly connecting said motor with the part of said shaft on the exterior of said housing whereby said motor, said connecting means and said bearing are all located on the exterior of said housing, an exhaust air duct connected with a wall of said housing and registered with the interior of said housing, a blower connected with said duct to draw air from the interior of said housing and to reduce the pressure in said housing to subatmospheric, a fresh air inlet connected with a wall of said housing and having a damper by which to control the inflow of air, an electric heater mounted in said housing, moisture control means connected with said electric heater and in part located in said housing to control the energization of said electric heater in response to the moisture content of the air in said housing.

References Cited in the file of this patent

UNITED STATES PATENTS

| 1,415,623 | Atkinson | May 9, 1922 |
| 1,458,403 | Glessner | June 12, 1923 |
| 1,583,376 | Welch | May 4, 1926 |
| 1,784,727 | Harris | Dec. 9, 1930 |
| 2,017,728 | Oskamp | Oct. 15, 1935 |

FOREIGN PATENTS

| 891,747 | France | Mar. 17, 1944 |